Feb. 3, 1959  C. S. HAZARD  2,872,155
OPERATING MECHANISM FOR ROTATABLE PLUG VALVE
Filed Sept. 22, 1953  7 Sheets-Sheet 2

INVENTOR.
CHARLES S. HAZARD
BY *George H. Corly*
HIS ATTORNEY.

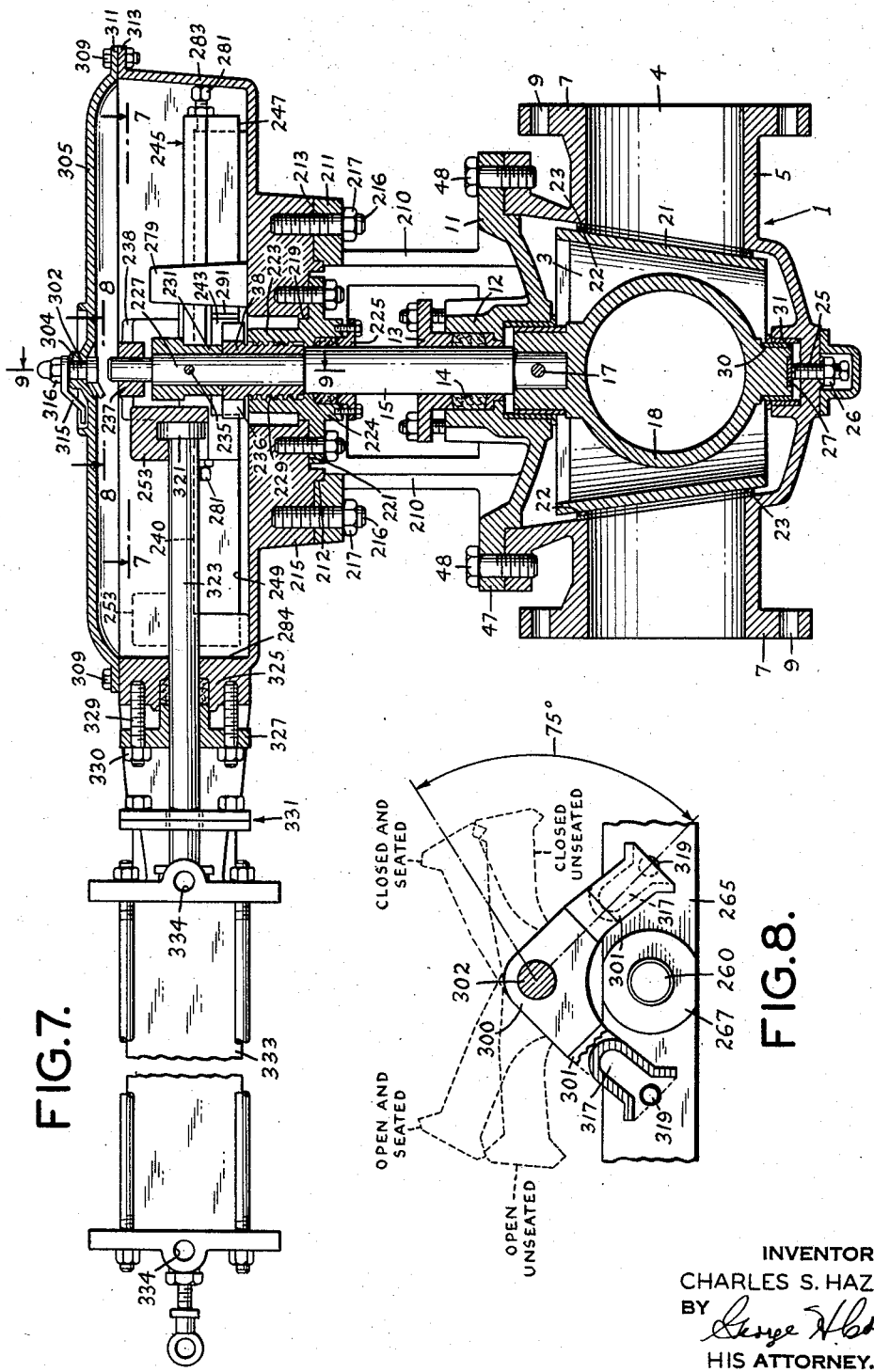

Feb. 3, 1959    C. S. HAZARD    2,872,155
OPERATING MECHANISM FOR ROTATABLE PLUG VALVE
Filed Sept. 22, 1953    7 Sheets-Sheet 5

INVENTOR.
CHARLES S. HAZARD
BY
HIS ATTORNEY.

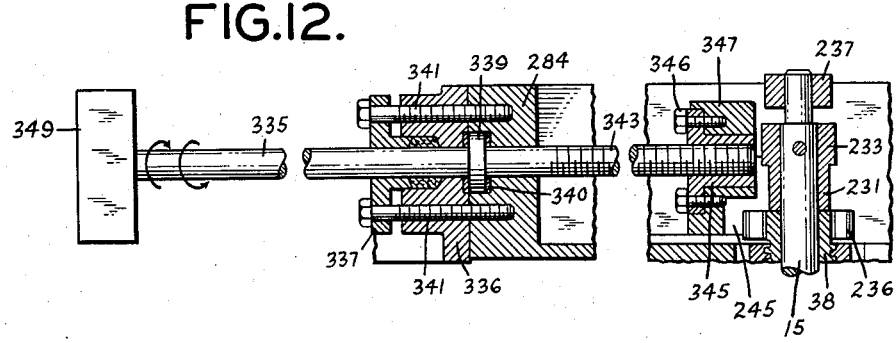
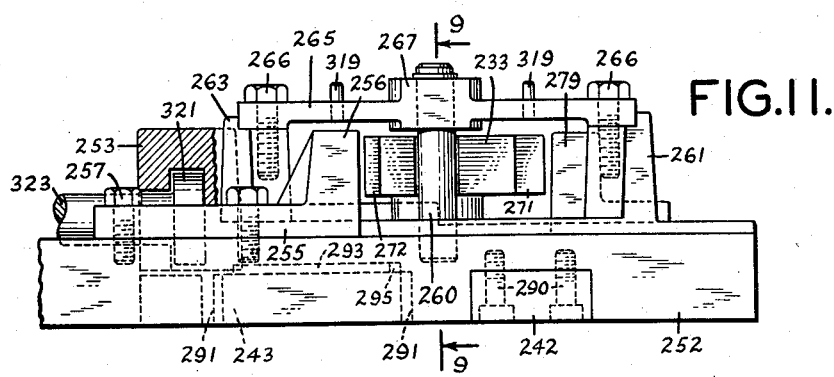
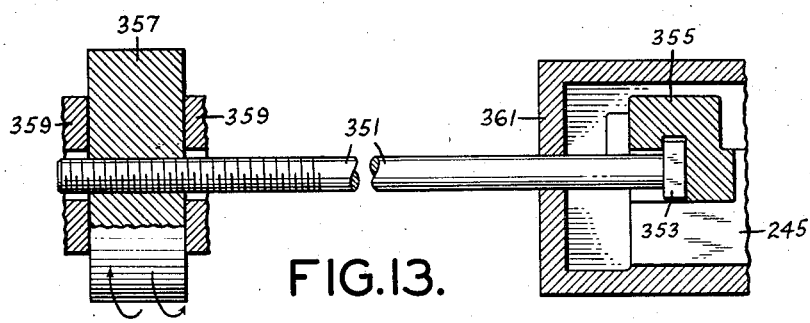

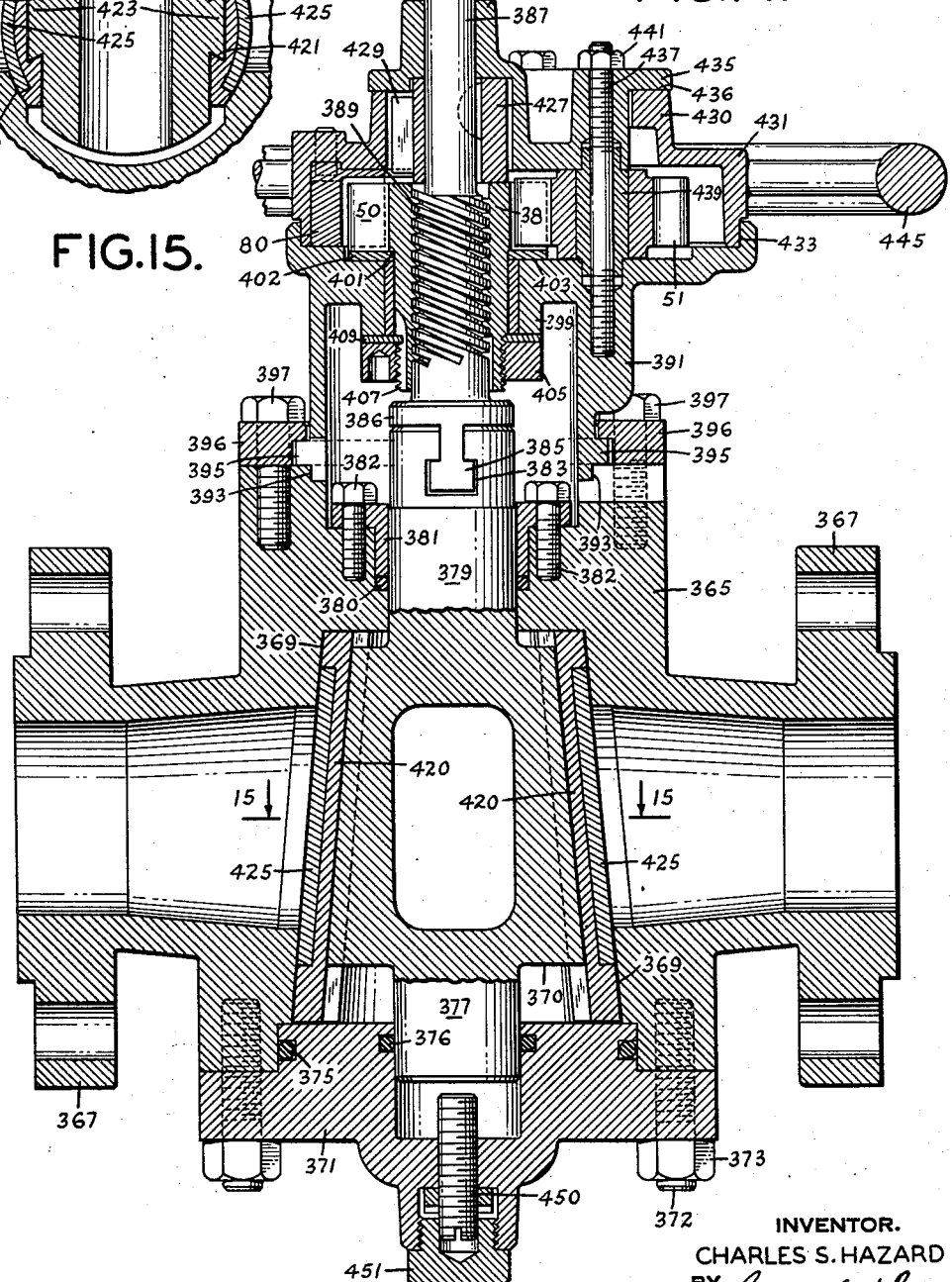

2,872,155

OPERATING MECHANISM FOR ROTATABLE PLUG VALVE

Charles S. Hazard, New York, N. Y., assignor to Neptune Meter Company, New York, N. Y., a corporation of New Jersey Application September 22, 1953, Serial No. 381,653

22 Claims. (Cl. 251—165)

This invention relates to mechanisms for operating valves and more especially to such mechanisms for valves of the type having a rotatable valve element. The invention particularly relates to operating mechanisms for valves having a conical rotatable valve element cooperating with a conical valve seat.

In the operation of such valves, particularly those having a conical valve element bearing on a conical valve seat and usually known as plug valves, it has been found advantageous heretofore to provide for lifting the plug from its seat by axial movement of the plug before rotating the plug in the opening and closing movements thereof. Undue wear and scoring of the seat and plug as well as easier operation of the valve thereby are secured. In order, however, to avoid the deposition of sediment, scale and foreign matter upon the valve seat when the valve is open and removed from its seat it has been found advantageous again to reseat the plug in this open position. Numerous mechanisms have been proposed for accomplishing the series of movements of lifting the plug from its seat, rotating the plug through the desired angle between the closed and open positions and returning the plug to its seat and for effecting these movements of the plug both in connection with opening rotation of the plug and closing rotation of the plug.

It is an object of the invention to provide a simplified mechanism for effecting this series of movements of the valve plug.

It is another object of the invention to provide a mechanism for operating a rotatable plug valve with the series of movements referred to, this mechanism having relatively few parts which need not be manufactured with high precision and being capable of manufacture at low cost.

It is a further object of the invention, however, to provide a valve operating mechanism in which the movable parts are of such kinematic form and arrangement that sufficiently precise movements of the plug are secured in lifting the plug from and returning the plug to its seat and in rotating the plug to the open and closed positions.

It is a still further object of the invention to provide a mechanism which is capable of being connected to conventional power or manual valve operators for operating this mechanism to operate the valve.

It is an additional object of the invention to provide an operating mechanism for a rotatable plug valve which compensates for lost motion initially existing due to crude forms of the parts or due to wear of the parts, thereby maintaining the desired accuracy of the operation of the valve in its unseating and seating movements.

It is another object of the invention to provide a valve operating mechanism which is capable of operating various types of rotatable conical plug valves and which may be connected to such valves at either the large or the small end of the conical plug.

An important feature of the invention is concerned with the means for lifting the plug from its seat before rotation thereof and for returning the plug to its seat after it thus has been lifted and rotated to the open or to the closed position of the valve respectively from the closed and open positions thereof. With respect to this feature in a broad aspect the invention provides actuating means supported for movement thereof in a predetermined path forwardly successively through two zones of such movement spaced along this path. This actuating means is supported also for reverse movement thereof successively through these two zones in reverse order. In this movement of the actuating means it is brought successively into driving engagement with kinematic means respectively in these two zones. This kinematic means, therefore, is actuated twice during the forward movement of the actuating means and similarly is actuated twice during the reverse movement of the actuating means.

It is a significant feature of the invention that for the desired cooperation of the actuating means with the kinematic means the actuating means and the kinematic means are of such form and are so disposed relative to each other as to produce both forward and reverse movements of the kinematic means during the forward movement of the actuating means as well as during the reverse movement of this actuating means in the path of movement thereof. In order that the mechanism of the invention comprising the actuating means and the kinematic means may accomplish the purpose of lifting the rotatable plug of the valve from its seat and return thereof to its seat, as above mentioned, the kinematic means is operatively connected to the rotatable plug for effecting axial movement of the plug from its seat upon forward movement of the kinematic means and axial movement of the plug toward its seat upon reverse movement of the kinematic means. The mechanism also is operatively connected to the rotatable plug of the valve so that upon operation of an operable member of the valve by a suitable valve operator or by hand the kinematic means first will be moved forwardly to lift the plug from its seat. The plug then will be rotated to the desired open or closed position and thereafter the kinematic means will be reversely moved to reseat the plug upon its seat, these three steps being effected during movement of the actuating means in either of its two directions of movement concomitantly with movement of the operable member forwardly or reversely.

The invention may make use of conventional elements cooperating with the plug of the valve or its stem for effecting the axial and rotational movements of the plug. A rotatable sleeve, for example, carrying a thread cooperating with a nut held stationary with respect to the body of the valve may be utilized, as in the prior art, by operatively connecting this sleeve to the valve plug or to its stem to produce the axial movements of the plug concomitantly with forward and reverse rotation of the sleeve. Other conventional means may be utilized for effecting the axial movements of the plug or its stem concomitantly with forward and reverse movements of such conventional means. The mechanism of the invention may be operatively connected to such conventional means to effect the desired operation of the valve.

The general concept of the mechanism of the invention may be clearly understood from a description of an embodiment thereof in which the kinematic means comprises gear means which is supported for rotation thereof forwardly and reversely, this gear means being connected to a rotatable means, such as a threaded sleeve as above described, operatively connected to the plug of the valve for effecting the axial movements of the valve upon forward and reverse movements of this gear means. The actuating means comprises gear segment means cooperating with this gear means and supported for movement of this gear segment means in a predetermined path forwardly successively through two zones of such movement spaced along this path and reversely successively through these zones, as above described in connection with the broad concept of the invention. This gear segment means is disposed so as to be movable in this path into driving meshing relation with the gear means successively in these two zones so as to produce the forward and reverse movements of the gear means both during forward movement and during reverse movement of the gear segment means, thereby to produce the two axial movements of the plug both in opening and closing movements of the valve.

As will be more clearly understood in the following description taken in connection with the drawings, the gear means may be provided by a gear which is operatively connected to a rotatable member connected to the plug and capable of effecting the axial movements of this plug, as above mentioned, when the gear is rotated respectively forwardly and reversely. The gear segment means then may be provided by a pair of gear segment elements supported for movement in parallel paths at opposite sides of the axis of rotation of the gear and connected together in spaced relation in the direction along these paths so as to move in meshing engagement with the gear in succession. The gear is rotated first in one direction by a given gear segment element engaging therewith and then in the opposite direction when the given element moves out of engagement and the other element moves into engagement with this gear, thus effecting corresponding rotation of the rotatable member in a given direction and in the opposite direction and lifting the plug from and returning this plug to its seat.

In a modification of the embodiment which utilizes gear means and gear segment means cooperating to produce the axial movements of the plug a pair of meshing gears may be provided operatively connected to the rotatable member which produces the lifting of the plug from its seat and return of this plug to its seat. In this modification a gear segment may be supported for movement in a predetermined path which may be a path generally but, as hereinafter more fully set forth, not necessarily precisely along the arc of the pitch circle of this gear segment. This gear segment is supported for movement in this path so as to move successively into engagement with the two meshing gears. It will be understood that, upon engagement of this gear segment with one of these gears, each gear will be rotated on its axis in a direction which may be termed the forward direction for the respective gears. The gear segment is of such arcuate extent that it will move out of engagement with the first gear concomitantly with moving into engagement with the second gear. As described hereinafter in greater detail means are provided for insuring that the gear segment clears engagement with the first gear upon engagement with the second gear so that the gear mechanism will not become locked. As the gear segment leaves the first gear and in its continued forward movement engages the second gear, reverse movement of the two gears is effected so that the rotatable member to which these gears are operatively connected is reversely rotated, thereby to produce the opposite axial movement of the plug. Reverse movement of the gear segment in its path produces first the forward rotation and then the reverse rotation of the two gears with corresponding lifting and reseating of the valve plug.

Because it is desired to lift the plug from its seat before effecting rotation of this plug and, further, to return the plug to its seat after it has been rotated to either the open or the closed position of the valve, it is necessary that an operative connection be provided between the plug and the mechanism above generally described such that intermittent operation of this mechanism or intermittent connection thereof to the plug is secured and in such timed relation that, when the plug is lifted to the requisite extent from its seat, rotational movement is given to this plug and, as the plug approaches or reaches either the open or the closed position thereof, reverse axial movement of the plug and seating thereof are effected. As will be understood more clearly from the description of the specific embodiments shown in the drawings, kinematic devices which are similar to a Geneva movement may be utilized for producing the intermittent movements. The invention, however, provides novel arrangements and cooperation of elements of such kinematic devices with the plug lifting and reseating mechanism of the invention. The invention, therefore, includes these kinematic devices for intermittently effecting rotational movement of the plug in timed relation to the lifting and seating of the plug as effected by the mechanism above referred to, more especially the gear means and gear segment means in the two modifications above briefly described.

As the mechanism of the invention preferably utilizes gear means and gear segment means having rotatable elements and cooperating with a rotatable member operatively connected to the plug for effecting the lifting and reseating movements of the plug, and as conventionally such rotatable member may be disposed on the axis of the plug or of its stem, the plane of operation of the gear means and the gear segment means may be disposed perpendicular to the axis of the plug of the valve. Such disposition of the mechanism of the invention makes it possible to provide a simple operative connection to the plug of the valve at either end of the cone of this plug. Such operative connection may be provided by merely extending the stem of the plug at the selected end and connecting the gear means directly to the rotatable member rotating on the axis of the plug at this end. Within the scope of the invention, however, the plane of operation of the gear means and the gear segment means may be in any desired relation to the axis of the plug or its stem, suitable operative connection being provided between the gear means and the rotatable member to produce the forward and reverse rotations thereof upon operation of the mechanism.

Since the gear means and gear segment means are operable generally in a plane, the path of movement of the gear segment means being disposed in this plane, power or manual valve operators of conventional design which provide a driving member adapted for rectilinear movement or one adapted for movement of rotation may be readily connected to the mechanism of the invention to produce the movements of the gear segment in its path as above described, thereby to produce the movements of rotation of the gear means which effects rotation of the rotatable member and the lifting and reseating movements of the plug. As above mentioned and as more fully described hereinafter, the structure of the invention associated with the mechanism which includes the gear means and the gear segment means includes also means to which a selected valve operator may be connected for effecting the intermittent rotational movements of the plug between open and closed positions thereof.

Figure 10:
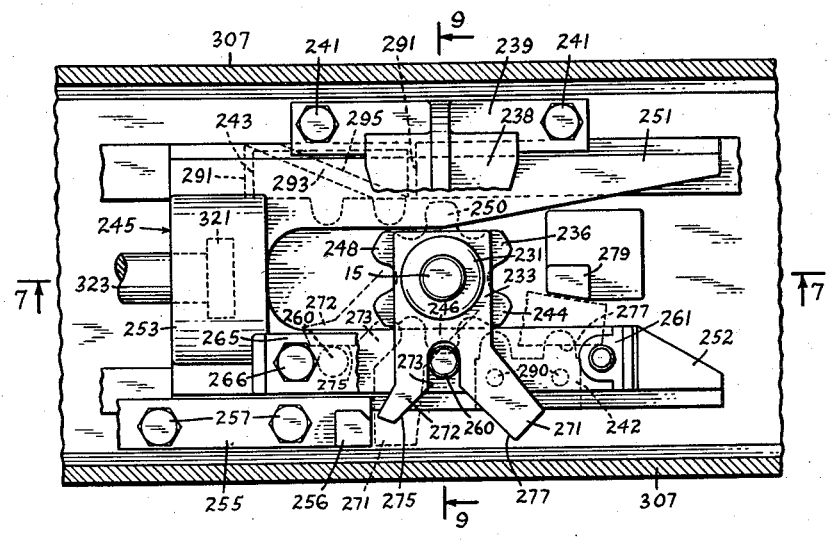

The invention will be more specifically described in several embodiments thereof as shown in the drawings in which:

Fig. 5 is a section on line 5—5 of Fig. 2;

Fig. 6 is a perspective view of a bridge supporting certain parts of the mechanism of the invention;

Fig. 7 is a longitudinal section taken on line 7—7 of Fig. 10 through a plug type valve to which is connected the mechanism of the invention in another modification thereof;

Figure 9:
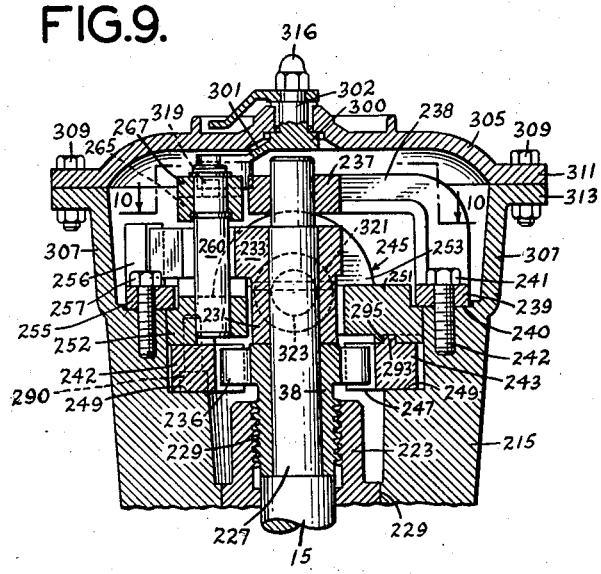

Fig. 8 shows in plan view a portion of an indicating mechanism;

Fig. 9 is a transverse section taken on line 9—9 of Fig. 10;

Fig. 10 is a fragmentary section on line 10—10 of the mechanism of Figs. 7 and 9, certain parts being broken away;

Fig. 11 is a longitudinal elevation of the actuating means of the mechanism of Figs. 7, 9 and 10;

Fig. 12 shows a modification of the actuating means of Figs. 7, 9 and 10 providing for connection to a valve operator having a rotatable operating member;

Fig. 13 shows diagrammatically another modification of the actuating means of Figs. 7, 9 and 10 providing for connection to a valve operator having a rotatable operating member;

Fig. 14 shows a longitudinal section of a plug type valve of inverted form with the mechanism of the invention disposed at the small end of the plug.

Fig. 15 is a section on line 15—15 of Fig. 14.

The mechanism of the invention as shown in the embodiment of Figs. 1, 2, 5 and 6 is connected to a valve 1 having a conical plug 3 rotatable on an axis perpendicular to the run 4 of the valve the body 5 of which is provided with flanges 7 having bolt holes 9 therein for connection to companion flanges in the pipe line. The valve 1 is also provided with a bonnet 11 carrying stuffing box 12 and gland 13 for confining packing 14 in the stuffing box in the conventional manner to provide pressure tightness with respect to the rotatable stem 15 of the valve connected by pin 17 to the structure 18 carrying the conical plug 3, this structure providing the fluid conveying passage 19 through the plug which may be rotated into and out of position in alignment with the run 4.

In the conventional manner the conical body 21 of the plug 3 may be provided with bearing rings 22 of wear and corrosion resisting material, such as alloy steel, these rings 22 being seatable on seat rings 23 carried by the body 5 of the valve. The bearing surfaces of these rings may be ground to finished size so that when the conical plug is seated the requisite tightness is secured between the plug and the body. In order to adjust the bearing of the seatable surfaces and to take the thrust of the operating mechanism an adjusting screw 25 having a lock nut 26 is threaded in the body of the valve so as to bear against plate 27 carried by the structure 18 of the plug 3. On suitable hubs 28, 29 formed on the structure 18 wear sleeves 30 are fitted in rotatable bearing relation to bushings 31 carried in hubs 32 provided respectively on the body 5 and the bonnet 11.

Figure 1:
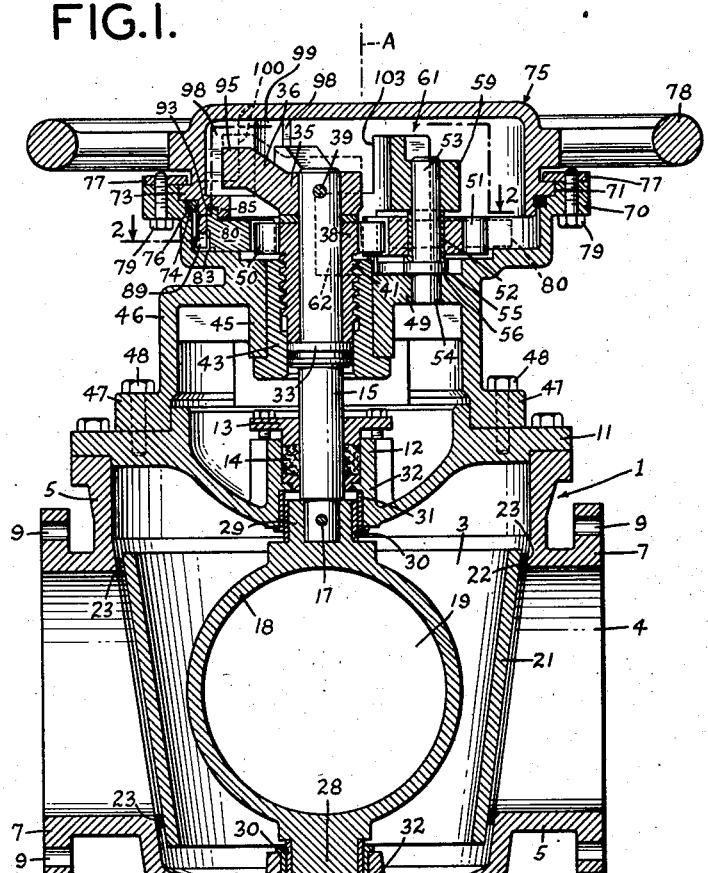
Fig. 1 is a longitudinal section through a plug type valve provided with mechanism embodying the invention.

The stem or spindle 15 may replace the conventional valve stem for the purposes of the invention, stem 15, as shown in Fig. 1, having a collar 33 integral therewith between which and the hub 35 of a cam follower 36 a sleeve 38 is disposed on the stem 15, the hub 35 being pinned by pin 39 to the stem 15. The sleeve 38 is rotatable on the axis of the stem 15 relative to the stem and carries on its circumference threads 41 threaded in the threads of a bushing 43 fixed in the hub 45 of a supporting body 46 having flanges 47 in fitted bearing relation to the bonnet 11 and fastened thereto by means of tap bolts 48. It will be apparent, since the sleeve 38 is rotatable in the bushing 43 in threaded relation thereto and is rotatable relative to the stem 15 and bears against the collar 33 and the hub 35, that such rotation of the sleeve 38 will produce axial movement of the stem in one direction or the other according as the sleeve is rotated forwardly or reversely upon the axis of the plug.

The sleeve 38 adjacent the hub 35 is provided with gear teeth 50. Meshing with the gear teeth 50 are the teeth of a gear 51 supported for rotation on the stud 53 having a shank 54 driven or otherwise secured in a hole in the web 49 of the body 46. The stud 53 is provided with a collar 55 bearing on a finished surface 56 machined on the upper side of the web 49, the axis of the stud 53 being disposed parallel to the axis of the stem 15 and at suitable distance therefrom to provide for meshing of the gears 50, 51.

Figure 2:
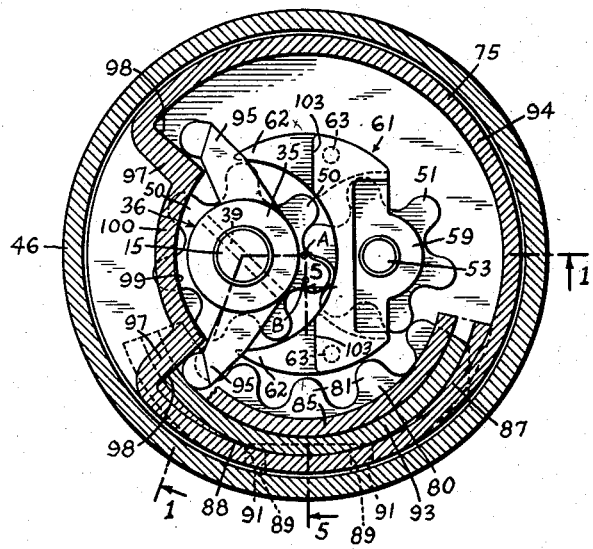
Fig. 2 is a section on line 2—2 of Fig. 1 transverse to the axis of the rotation of the plug.

The upper end of the stud 53 is fitted securely in a projecting portion 59 of a bridge piece or support 61 having projecting portions 62 Figs. 1 and 2 which are machined at the bottom surfaces thereof and bear on the surface 56 of the web 49, this bridge being cut away in circular arcs as shown in Fig. 2 to provide clearance for the gears 50, 51. The bridge 61 is fastened to the body 46 by means of suitable screws passing through the web 49 from below the position of which is indicated at the dotted circles 63 in Fig. 2. As shown in Fig. 1 the gear 51 may be provided with a bushing 52 for rotation with the gear 51 on the stud 53.

The body 46 in Fig. 1 is extended upwardly to provide a circular flange 70 having an internal shoulder 71 turned therein upon which the machined surfaces of a projecting flange 73 of a rotatable operating member 75 bear so that the rotatable member is guided in rotation by the cylindrical portion of the shoulder 71. The rotatable member 75 carries a hand wheel 78 connected rigidly thereto for effecting rotation thereof. A supplementary shoulder 74 in the body 46 carries a packing ring 76 sealing against leakage of lubricant from the mechanism, the under face of the flange 73 sliding in sealing bearing relation also upon this packing. Upon the upper machined face of the flange 73 retaining elements 77 bear and are held in slidable engagement with the flange 73 by bolts 79 tapped therein and passing through holes in the flange 70 of the body 46.

The axis A of the cylindrical surface of the shoulder 71 is parallel to the axes of the stem 15 and the stud 53 and is disposed on the line connecting the axes of the stem and the stud as shown in Fig. 2. The member 75, therefore, may be rotated on the axis A to different positions. This member carries means for effecting rotation of the sleeve 38 forwardly and reversely during rotation of the member 75 in a given direction and for effecting rotation of the sleeve forwardly and reversely also during the reverse rotation of the member 75 in the manner generally referred to above and about to be described. This rotatable member 75 also carries means cooperating with the cam follower 36 above mentioned to produce rotation of the stem 15 and of the plug of the valve in the manner hereinafter described.

The means for effecting the rotation of the sleeve 38, that is to say the means for producing rotation of the meshing gears 50, 51 in one direction upon their respective axes and then in the opposite direction during continued movement of the rotatable member 75, comprises a gear segment 80 of arcuate form having teeth 81 for meshing with the gears 50, 51 in succession as the segment 80 is moved in the arc of a circle about the gears 50, 51. In Fig. 2 the segment 80 is shown in the position in which it is about to disengage from one of the gears 50, 51 and to engage with the other. It will be apparent that if movement of the segment 80 is effected in the counterclockwise direction in Fig. 2 the tooth at the right hand end of the segment 80 will move a distance approximating the width of the space between the teeth and then will engage a tooth of the gear 51. In such movement the extreme left hand tooth of the segment 80 will pass out of engagement with the tooth of the gear 50. Upon engagement of the segment 80 with the gear 51 the gear 51 will be rotated in the counterclockwise direction and the gear 50 meshing therewith will be rotated in the clockwise direction. By forming the threads 41 on the sleeve 38 with right hand or left hand pitch, as the case may be, such rotation of the gears 51, 50 will produce axial movement of the sleeve and of the stem 15 and the plug 3 of the valve away from or toward the seating positions of the rings 22, 23. Reverse arcuate movement of the segment 80 from such engagement with the gear 51 first will produce clockwise rotation of the gear 51 and counterclockwise rotation of the gear 50. This reverse movement of the segment 80, therefore, will produce the opposite axial movement of the sleeve 38 and of the stem 15 and the plug 3. Thus, if the plug 3 is seated when the segment 80 is in engagement with the gear 51, the threads 41 may be of such hand that this reverse movement of segment 80 first will produce axial movement of the plug away from the seating rings 23. When the segment 80 again reaches the position shown in Fig. 2 this axial movement will have been substantially completed. Continued movement of the segment 80 in the clockwise direction in Fig. 2 will bring the tooth at the left hand end of the segment into engagement with the teeth of the gear 50, thereby effecting clockwise rotation of the gear 50 and counterclockwise rotation of the gear 51. Such rotations of the gear 50 and 51, therefore, will effect reverse rotation of the sleeve 38 and seating movement of the plug 3. Upon counterclockwise rotation of the segment 80 from the leftward position thereof again toward the position of Fig. 2 counterclockwise rotation of the gear 50 and clockwise rotation of the gear 51 will take place, thereby effecting rotation of the sleeve 38 to produce axial movement of the stem 15 and the plug 3 away from the seating rings 23. Continued counterclockwise movement of segment 80 into meshing engagement again with gear 51 produces counterclockwise movement of gear 51 and clockwise movement of gear 50 to effect seating movement of the plug. The position of the segment 80 in Fig. 2, therefore, corresponds generally to the position of the plug 3 unseated from the seating rings 23.

For producing the arcuate movement of the segment 80 the rotatable member 75 is provided, as shown in section in Figs. 1 and 5, with depending walls 85, 87 forming therebetween a groove 88. From the wall 87 a lug 89 projects downwardly as shown in Fig. 5 for engagement with the end surfaces of a notch 91, Fig. 2, formed in the segment 80 at the outer part thereof relative to the teeth 81. The lug 89 is of less length in the arcuate direction than the length of the notch 91 so that movement of the lug 89 within the notch takes place upon rotation of the rotatable member 75 with some lost motion before the arcuate segment 80 is moved. In the movement of the lug 89 from engagement with an end surface 91 of the notch to engagement with the other end of this notch sliding movement of the walls 85, 87 relative to an upstanding rib 93 of the segment 80 machined to fit the groove 88 formed between the walls 85, 87 may take place.

As will be noted in Fig. 2 the arcs of the rib 93 and the cylindrical surfaces of the groove 88 in sliding contact with this rib are not concentric with the enclosing wall 94 of the member 75 centered on the axis A of rotation of member 75. The center upon which the surfaces of groove 88 are formed is disposed at B spaced in the member 75 from the center A toward the segment 80. The center B, therefore, moves about the center A as the member 75 is rotated. The radii of the surfaces 88, moreover, are such that the curvature of the arcs of these surfaces is greater than that of the cylindrical wall of the member 75 and greater than the curvature of the arc of the pitch circle of the teeth of the segment 80. It will be shown hereinafter that, as the rib 93 of segment 80 moves in the groove 88 about the center B, lagging behind the movement of the walls 85, 87, the trailing end of the segment 80 in meshing engagement with one or the other of the gears 50, 51 is disposed inwardly toward these gears, the leading end of the segment being correspondingly outwardly disposed, thereby to aid in clearing the leading tooth as the leading tooth of the segment 80 approaches engagement with the other gear. Jamming of the segment with the teeth of the gears thereby is avoided.

In the operation of the device, because the length of the lug 89 is less than the length of the notch 91, the forward end of the lug 89 carried by the rotatable member 75 first moves into engagement with the adjacent end surface of the notch 91 at the start of the rotation of the member 75 from one of its extreme positions, this lug 89 moving from engagement with the other end surface 91 which it previously engaged during rotation of the member 75 in the opposite direction. In such movement of the lug in the notch 91 movement of the segment about the center A is prevented by the friction of the parts, the segment gear being in engagement with one of the gears 50, 51. In the relative movement which takes place between the depending walls 85, 87 of the member 75 and the rib 93 of the segment during this initial movement of the lug 89 in the notch 91, the leading end of the segment will be moved outwardly somewhat with respect to the center A and the trailing end will be moved inwardly somewhat toward the center A because of the movement of the segment along the arcs of greater curvature. The lost motion provided between the lug 89 carried by the member 75 and the segment 80 makes this relative arcuate movement effective to produce a tilting of the segment which secures the desired clearance of the leading tooth of the segment when this tooth approaches engagement with a gear 50, 51.

Moreover, since by virtue of the tilting action the trailing tooth of the segment is in closer engagement with the teeth of the gear from which it is about to be disengaged, this engaged gear driven by the segment is rotated through a somewhat greater angle than otherwise would be the case and the other gear which it at that time is driving also is rotated somewhat beyond the position which it otherwise would assume. Thus, there is secured additional clearance between the leading tooth of the segment and the tooth of the gear which it is approaching so that this leading tooth of the segment may clear the adjacent tooth of the gear being approached and may move into a space between teeth of this approached gear. Jamming of the leading tooth with a tooth of the approached gear is avoided. This provision for clearance and easy entering and leaving of the teeth of the segment into and from meshing engagement with the respective gears 50, 51 makes it unnecessary to utilize accurately machined gears and other precisely machined parts, it being possible to use gears with cast teeth or produced by other low cost methods. Moreover, as the effective surfaces for the arcuate and tilting movements are formed on circular arcs, as will be evident from a consideration of Fig. 2, the requisite machining operations are neither complicated nor costly.

The mechanism above described is effective to produce unseating and reseating of the plug of the valve. In order to effect rotation of the plug and to accomplish this rotation in proper timed relation to the unseating and seating movements, in the embodiment of the invention of Figs. 1 and 2 the cam follower 36 is provided with two arms 95 extending from hub 35. The rotatable member 75 is formed with introverted wall portions 97 which provide cam faces 98 extending generally radially from the center A and of such radial extent and disposition that the arms 95, which in Fig. 2 are shown in the median position and both in operative engagement with the surfaces 98, may slidably clear the inner circumferential surface 99 of the wall 100 when the respective arms are disposed at the extremes of their movement upon the axis of the stem 15 and in engagement with one or the other of the abutment surfaces 103 of the bridge 61. In such extreme position the rounded end portion of the other arm 95 will be in engagement with the cam surface 98 outwardly along this surface from the cylindrical surface 99. It will be understood that upon rotating the rotatable member 75 the respective arms 95 are driven in one direction or the other by engagement with one of the surfaces 98, and the stem 15 thereby is rotated to rotate the plug 3 through the requisite angle between open and closed positions of the valve. If, as ordinarily is the case, this angular rotation of the plug 3 is approximately 90° the rounded contact surfaces of the arms 95 are so disposed in angular relation to each other upon the axis of the stem 15 and the radial cam surfaces 98 are so angularly related about the axis A of rotation of the member 75 that approximately 90° rotation will be secured for the stem 15 between the extreme positions of the cam follower 36 when one arm 95 or the other bears against the corresponding abutment surface 103. The position of the cam follower 36 shown in Fig. 2 with both arms 95 engaging the respective cam surfaces 98 corresponds to the median position shown of the segment 80 and to the position of the plug in which this plug is in the median position of its movement between open and closed positions.

As shown in Fig. 1 the cam surfaces 98 have an extent parallel to the axis of the stem 15 such that the cam follower 36 may move with the stem 15 parallel to this axis between the full line and dotted line positions of the cam follower 36 while maintaining the requisite contact of the arm 95 with the surface 98.

Figure 4:
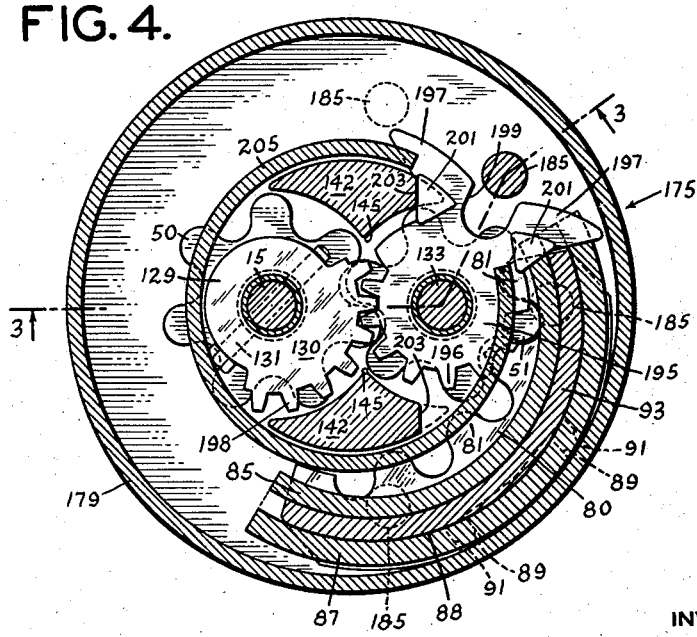
Fig. 4 is a section on line 4—4 transverse to the axis of the valve in Fig. 3.
Figure 3:
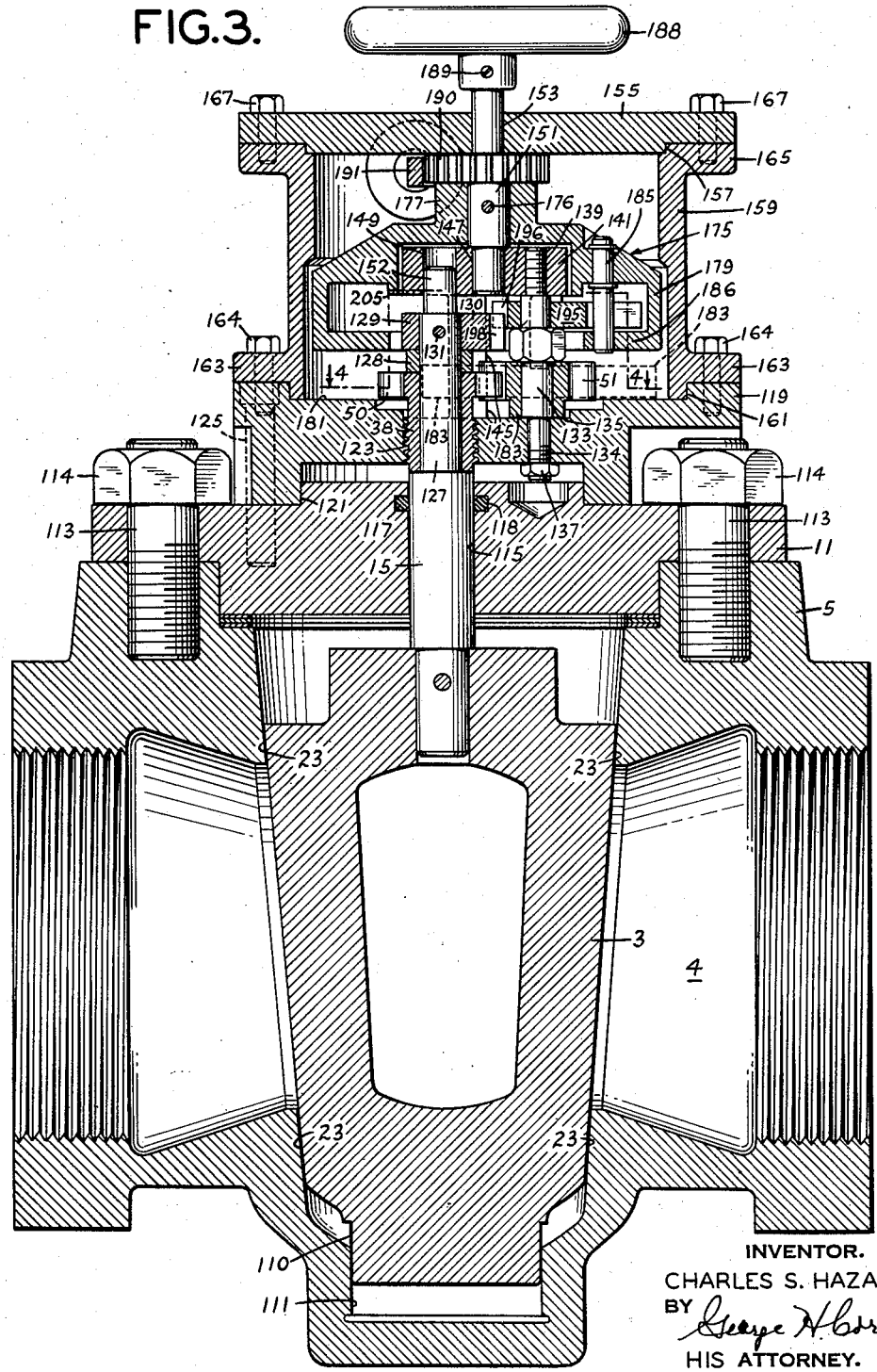
Fig. 3 is a longitudinal section of a plug type valve provided with a modification of the mechanism of the invention.

In Figs. 3 and 4 is shown another embodiment of the invention for operating a rotatable plug type valve having a body 5 and a rotatable plug 3 machined to fit against the conical seats 23 formed in the body 5. The plug 3 has a hub 110 formed at the smaller end thereof rotatably fitting in a bore 111 machined in a recess in the body 5. In this embodiment the body 5 is threaded at the opposite openings of the run 4 thereof for engagement with threaded pipe sections. A bonnet 11 is secured by studs 113 and nuts 114 to the body 5 and provides a central opening 115 for passage of the stem 15 therethrough, a packing ring 117 being inserted in an annular groove 118 formed in the bonnet 11.

The mechanism of the invention is this embodiment is supported on a supporting plate 119 bored to fit a turned boss at 121 on the bonnet 11 to dispose the threaded opening 123 in the plate 119 concentric with the axis of the stem 15 of the valve. This plate is secured to the bonnet by tap bolts 125 distributed about the axis of the stem, only one of these bolts being shown in dotted outline in Fig. 3 for the sake of clarity.

The stem 15 is provided with a shouldered portion 127 upon which rotatably is carried a sleeve 38 having threads engaging the threads 123 of the plate 119. The sleeve 38 at the end thereof opposite the shoulder in the stem 15 bears through a washer 128 against the hub 129 of a quadrant gear 130 secured to the stem by pin 131. The gear 130 upon rotation thereof by means hereinafter to be described effects rotation of the plug 3 between open and closed positions of this plug. Axial movement of the stem is accomplished by rotational movement of the sleeve 38 bearing at its respective ends against the shoulder of the stem 15 and against the hub 129 of the gear 130 to effect unseating and seating movements of the plug 3 in the manner described in connection with Figs. 1 and 2.

Rotation of the sleeve 38 also is accomplished in a manner similar to that described in connection with Figs. 1 and 2, this sleeve being provided with a gear 50 meshing with a gear 51 supported for rotation thereof on stud 133 having a shank 134 extending through the plate 119 and shouldered against the upper surface 135 machined on this plate. The stud 133 is secured to the plate by the nut 137.

The gears 50 and 51 are engageable by segment 80, Fig. 4, having rib 93 arcuately slidable between the cylindrical surfaces of the groove 88 in the same manner as described in connection with Figs. 1 and 2. In Fig. 4 this arcuate segment is shown in the position in which an end tooth 81 is in engagement with the gear 51, the parts being in the positions which they reach when the segment has moved in the clockwise direction in Fig. 4 from its extreme counterclockwise position to the position approaching its disengagement from the gear 51 and concomitant engagement with the gear 50. This is the position just prior to that in which rotating movement of the stem and plug will be started in the manner about to be described.

It will be understood that the movement of the segment 80 in Fig. 4 in the clockwise direction effects clockwise rotation of the gear 51 and counterclockwise rotation of the gear 50 while the segment is in engagement with the gear 51. As the segment continues its clockwise movement and the trailing end tooth leaves the gear 51 and the leading end tooth of the segment comes into engagement with the gear 50 clockwise movement of the gear 50 will be started and concurrently counterclockwise movement of the gear 51 driven by the gear 50. Reverse or counterclockwise movement of the segment 80 in Fig. 4 first will produce counterclockwise rotation of the gear 50 concurrently with clockwise rotation of the gear 51. When the segment 80 moves out of engagement with the gear 50 and into engagement with the gear 51 clockwise movement of the gear 50 and counterclockwise movement of the gear 51 again will be produced.

It will be understood from the description which has been given in connection more particularly with Figs. 2 and 4 that in the movement of the segment 80 in each direction both the forward and the reverse movements of each of the gears 50, 51 is produced, so that in each such movement of the segment the threaded sleeve 38 is rotated in succession in both directions to produce the axial movement of the stem and the plug to lift the plug from its seat and to return the plug to its seat. The operation of the mechanism of the invention for producing these axial movements is effected in timed relation to the kinematic means about to be described for effecting rotation of the plug between its open and closed positions.

The stud 133, Fig. 3, at its upper end 139 is threaded into the projection 141 of a bridge member 140, Fig. 6. This bridge member is provided with legs 142 extending to surfaces at the end opposite to the projection 141 finished to fit upon the surface 135 of the plate 119 to which the bridge 140 may be fastened by bolts, not shown, passing through the plate 119 into tapped holes 143 in the bridge 140, Fig. 6. The legs 142 are spaced apart as shown in Figs. 4 and 6 to provide space for the engaging gears 50, 51 and the meshing gears of the kinematic means for rotating the plug which is to be described. The legs 142 are formed with arcuate inner surfaces meeting in each leg at an edge 145. In the integral head of the bridge 140 holes 147 and 149 are provided respectively for the shouldered ends of the shaft 151 and of the upper end 152 of the stem 15. The upper end of the shaft 151 is carried in the bore 153 of a plate 155 having a turned boss 157 fitting in a shoulder of a supporting and enclosing cylindrical member 159 itself machined to fit in the shoulder 161 in the plate 119, in order to maintain the alignment and concentricity of the rotatable parts with the stem of the plug and other kinematic relations for proper operation of the mechanism of the invention. The supporting member 159 is provided with flanges 163 bearing on the upper surface of the plate 119 and secured to this plate by tap bolts 164. The support 159 also is provided with flanges 165 tapped for tap bolts 167 passing through holes in the plate 155 to secure this plate to the support 159.

The shaft 151 carries a rotatable member 175 secured to this shaft by pin 176, the member 175 being provided with a hub 177 through which the shaft and the pin extends, the hub having a bore receiving the shaft 151. The rotatable member 175 provides circumferential walls extending about the upper part of the bridge 140 and downwardly toward the gear segment means and the gears 50, 51. The outer wall 179 of the member 175 is connected to the walls 85, 87 which provide the groove 88, Fig. 4, so that the member 175 carries these depending walls. The segment 80, however, bears on a surface 181, Fig. 3, similarly to the segment 80, Figs. 1 and 5, bearing on the surface 83. In Fig. 3, which is a section taken on line 3—3 of Fig. 4, the cross section of the segment and the cooperating walls 85, 87 are not seen but the rectangle 183 in dotted lines is intended to show in phantom the general position of the segment 80 and the parts cooperating therewith which are carried by the rotatable member 175 to effect movement of the segment 80 and forward and reverse rotation of the respective gears 50, 51 as above described in connection with Figs. 1, 2 and 5.

The rotatable member 175, Fig. 3 and 4, carries a pin 185 secured in the body thereof by suitable means with the axis of the pin parallel to the axis of the stem 15 of the plug. This pin 185 projects from the body of the rotatable member 175 into a hole in the inwardly projecting flange 186 of the member 175 spaced downwardly from the body. The pin 185, therefore, revolves about the axis of the shaft 151 when the member 175 is rotated on this axis. A hand wheel 188 is secured by pin 189 on the upward extension of the shaft 151, or a gear 190 may be driven by rack 191 more or less diagrammatically shown in Fig. 3 actuated by any suitable reciprocating means, the gear 190 being secured to the shaft 151 or formed upon the hub 177 of the rotatable member 175.

Above the gear 51, Fig. 3, the stud 133 is provided with an enlarged portion which serves to support a transfer gear member 195 having gear teeth 196 which mesh with the gear teeth 198 of the quadrant gear 130. It will be understood that the quadrant 130 is so formed and secured to the stem 15 that the stem may be moved axially until the hub 129 of the quadrant gear engages the head of the bridge 140. In such movement the teeth 198 move axially relative to the teeth 196 of the transfer gear 195. The transfer gear 195 is rotatable on the portion of the stud 133 immediately below the head of the bridge into which the stud 133 at its upper end 139 is threaded.

The transfer gear 195 is provided with wings 197, Fig. 4, at either side of a slot or recess 199 into which the pin 185 my enter as the rotatable member 175 is rotated on the axis of the shaft 151. Such engagement of the pin 185 with the wings 197 of the transfer gear member effects rotation of this transfer gear upon the axis of the stud 133 and corresponding rotation of the quadrant gear 130 meshing therewith and rotation of the stem 15 and plug 3 on the axis of the plug.

In Fig. 4 the extreme positions of the pin 185 in its movement upon rotation of the member 175 are shown in upper and lower dotted outlines. The pin 185, for example, moves from the upper dotted position in Fig. 4 to the full line position as shown in this figure, passing generally along the arc of the left hand wing 197 without kinematically engaging this wing to effect rotation of the transfer gear 195. During this movement, as above described, the segment 80 is moved clockwise from a position displaced from that shown in Fig. 4 to the position shown in this figure to effect rotation of the gears 50, 51 and lifting movement of the stem and plug. As the pin 185 continues its movement now in engagement with the right hand wing 197 of the transfer gear 195, the segment 80 will reach the position in which its trailing tooth is about to leave engagement with the gear 51 and its leading tooth is about to move into engagement with the gear 50. This position of the segment 80 is reached substantially when the pin 185 reaches the dotted line position which is on the horizontal diameter of Fig. 4. During these movements the gear 51 has been rotated clockwise and the gear 50 has been rotated counterclockwise, so that these movements of these gears correspond to lifting or axial movement of the plug away from its seat. As the member 175 is continued in rotation, the segment 80 moves into mesh with the gear 50 and now effects clockwise rotation of this gear and counterclockwise rotation of the gear 51 to effect seating movement of the plug during the movement of the pin 185 from the central dotted position to the lower dotted position in Fig. 4. During this movement, however, the pin 185 has continued the rotation of the transfer gear 195 on the axis of the stud 133 to effect full opening or closing rotation of the plug concomitantly with approximately 90° rotation of the quadrant gear 129 and of the stem 15, the angular movement of the transfer gear 195 being such as will accomplish this rotation of the plug having regard to the pitch radii of the quadrant gear and of the transfer gear.

It will be apparent as described in connection with Figs. 1 and 2 that reverse rotation of the rotatable member of Figs. 3 and 4 first will move the quadrant gear counterclockwise concomitantly with counterclockwise movement of the gear 50 and clockwise movement of the gear 51 again to effect unseating movement of the plug, such movement of these parts taking place as the pin 185 moves from the lowermost dotted position along the right hand wing 197 of the transfer gear of Fig. 4 to a position in which the pin 185 will engage the left hand wing as it enters the slot 199 to effect reverse rotation of the transfer gear and reverse rotation of the quadrant gear and the plug 3 to the position shown in Fig. 4. The pin 185 thereafter continues along the arc of the left hand wing 197 to the uppermost dotted position, the segment 80 effecting counterclockwise rotation of the gear 51 and clockwise rotation of the gear 50 to effect seating of the plug 3 in the manner described.

As shown in Fig. 4 the transfer gear 195 carries stop elements 201 which are disposed so as to come into abutting relation to the faces 203 on the legs 142 of the bridge 140 to limit the angular movement of the transfer member 195 and, therefore, of the quadrant gear 198 and the plug. To provide space for the movement of the stop elements 201 into and out of position against the respective abutment surfaces 203, the depending wall 205 of the rotatable member is cut away, as shown in Fig. 4, for sufficient length of the circumference to provide the requisite clearance for the stop elements 201 upstanding from the transfer gear wings 197.

In Figs. 7, 9, 10 and 11 is shown another embodiment of the invention in which the gear segment means is provided by two racks disposed for movement in parallel paths at opposite sides of the axis of a gear into and out of meshing engagement with which they are moved to effect the unseating and seating movements of the plug. In Fig. 7 a valve of similar construction to that of Fig. 1 is shown and like reference numerals are used in Fig. 7 to indicate the parts corresponding to those of Fig. 1.

In this embodiment the bonnet 11 is formed with upstanding struts 210 integral with the bonnet and supporting at the upper ends thereof annular flange 211 counterbored at 212 and having a machined top face 213. The housing for the mechanism of the invention comprises a base or body 215 into which are tapped studs 216 passing through holes in the flange 211 for holding the base 215 to the flange by means of the nuts 217. The base 215 is machined with an annular rib fitting to the counterbore 212 to maintain the mechanism of the invention supported by the base 215 in concentric and aligned relation to the axis of the stem 15 of the plug 3.

The base 215 also is provided with a bore 219 and a machined face 221 to receive the corresponding machined surfaces of a member 223 which provides stuffing box 224 with which cooperates gland 225 in the conventional manner for holding packing in place about the rotatable stem 15 of the plug. Similar to the embodiment of Figs. 1 and 3 a sleeve 38 is rotatably mounted on the shank 227 of the stem 15 forming a shoulder on this stem. The sleeve is provided with a thread which engages the thread 229 formed internally in the member 223. The sleeve 38 bears against the shoulder of the stem 15 and against the lower end of the hub 231 of a fork member 233 hereinafter further described. The hub 231 is pinned by pin 235 to the shank 227 for rotation with the stem 15 and the plug 3 upon the axis of the plug. The upper end of the stem 15 is formed with a reduced portion rotatable in the bearing 237 carried by bracket 238 having a flange 239 bearing on the machined surface 240 of the body 215 and secured to this body by tap bolts 241. It will be noted that the axial length of the bearing 237 and its disposition at the upper end of the stem are such that upon rotation of the sleeve 38 in the threaded member 223 the stem 15 and the fork member 233 may be moved axially until upper end of the fork member engages the bearing 237. In this movement the plug 3 is lifted from the seating rings 23 as described in connection with Fig. 1.

The sleeve 38 is provided with a gear 236 rotating with the sleeve on the axis of and relative to the stem 15. In this embodiment of the invention rack elements 242 and 243 for engagement with the gear 236 are supported on a slide member 245 having a machined lower surface 247 bearing on the surfaces 249, Figs. 7 and 9, machined in the body 215. These surfaces have a substantial lengthwise extent in a plane perpendicular to the axis of the stem 15 and sufficient transverse width to provide good sliding bearing, the surfaces 249 being disposed at opposite sides of the stem. The slide member 245 is provided with arms 251 and 252 extending toward the right, Fig. 10, from hub 253 by which they are rigidly carried. The flange or base 239 of the bracket 238 and the base 255 of a stop member 256 extend over upon shoulders machined respectively in the slide arms 251 and 252 for retaining these arms and the slide member 245 in sliding relation to the surfaces 249. The base 255 is secured to the body 215 by tap screws 257. As is apparent from Fig. 10 the arms 251, 252 are spaced apart so as to provide for passing the hub 231 of the forked member 233 with suitable clearance.

As shown in Figs. 9, 10 and 11 the arm 252 of the slide member 245 provides a hole therethrough into which an upright pin 260 is fitted. This arm is also provided with upstanding supports 261, 263, Figs. 10 and 11, across which the bridge piece 265 spans and is fastened to the supports 261, 263 by tap bolts 266. The bridge piece 265 is provided with a centrally disposed boss 267 provided with a hole into which also the upper end of the upright pin 260 is fitted. The bridge piece 265 thus cooperates with the arm 252 to hold the pin 260 rigid for movement of this pin with the slide member 245, that is, left to right and the reverse in Fig. 10.

The forked member 233, as shown in Fig. 10, is provided with fork arms 271 and 272 at either side of a slot 273 which receives the pin 260 when the forked arm 233 is in the median position shown in Fig. 10. This arm 233 is rotatable with the stem 15, as above mentioned, clockwise in Fig. 10 to a position in which the arm 271 of the fork abuts the stop 256, as shown in dotted outline. In this position the slot 273 has moved approximately 45° from the full line position shown in Fig. 10 and the fork arm 272 has moved to the dotted position shown. In this dotted position the surface 275 of the fork arm 272 becomes disposed horizontally in Fig. 10 and parallel to the movement of the slide 245 and of the pin 260, the surface 275 in the median position of Fig. 10 being substantially at 45° to the plane of the axis of the stem 15 and of the pin 260. Similarly, the surface 277 of the fork arm 271 in this median position is disposed at 45° to this plane at the opposite side thereof from the surface 275, so that the surfaces 275 and 277 are substantially at right angles. In the counterclockwise movement of the forked arm 233 from the position shown in Fig. 10 through an angle of 45° the surface 277 becomes positioned as shown in dotted outline parallel to the line of movement of the slide 245 and of the pin 260. In this position the arm 271 of the member 233 abuts stop 279 which is carried by the base 215. The limits of angular movement of the forked arm 233 thus are determined and thereby the angular rotation of the plug.

It will be understood that as the pin 260 moves with the slide 245 horizontally in Fig. 10 the forked arm 233 will be moved angularly in one direction or the other by engagement of the pin in the slot 273. When the forked arm reaches one or the other of its limit positions, for example the dotted position shown in Fig. 10, the pin moves out of the slot 273 and may continue to move in the continued movement of the slide 245 along the surfaces 275, 277 to the desired limits of movement of the slide 245. As shown in Fig. 7, the slide carries set screws 281 at opposite ends thereof provided with lock nuts for adjusting the position of these set screws relative to the slide 245, the heads of these set screws being adapted to come into abutment with the respective end walls 283 or 284 of the casing carried by the base 215 to limit the movements of the slide respectively toward the right and toward the left. A greater movement of the slide 245 is provided than that which corresponds to movement of the pin 260 in effecting the angular movement of the forked arm 233, substantially 90° for opening and closing rotation of the plug. This additional movement of the slide is utilized in accordance with the invention to effect the rotation of the sleeve 38 and unseating and seating movements of the plug respectively before and after the rotational movement of the plug in either direction of its opening and closing movements.

In the embodiment of Figs. 7, 9, 10 and 12 rotational movement of the sleeve 38 is accomplished by the segment racks 242 and 243 brought into engagement with the gear 236 in two zones of such engagement corresponding to two different positions of the slide 245 in the movement thereof. The rack 242 is set in a recess provided in the arm 252, as shown in Figs. 10 and 11, this rack having teeth disposed thereon for engagement with the teeth 236 of the sleeve 38 on a pitch line substantially tangent to the pitch line of the gear 236. The rack 242 is fastened by screws 290 threaded in the arm 252 from the bottom of the recess of the arm 252, this recess being open at the inner side for projection therethrough of the teeth of the rack 242 as shown in Fig. 9.

The arm 251 also is provided with a recess 291 in which the rack 243 is disposed. This recess 291 also is open at the inner side of the arm 251, the teeth of the rack 243 projecting therethrough for engagement with the teeth of the gear 236. As shown in Figs. 10 and 11 the length of the rack 243 is less than the length of the recess 291 so that endwise movement of the rack generally parallel to the line of movement of the slide 245 may take place relative to the arm 251. As shown also in section of Fig. 9 the rack 243 is provided with an upstanding rib 293 having machined surfaces. This rib is received in an inclined groove 295 which is machined in the underside of the arm 251. It will be apparent that, in the relative movement of the rack 243 with respect to the arm 251 in the direction generally parallel to the movement of the slide 245, movement of the rack 243 transversely of the movement of the slide and along the length of the rib and the groove also will take place until one end or the other of the rack 243 abuts an end wall of the recess 291. In Figs. 10 and 11 the rack 243 is shown in an intermediate position. The rack 243 in this transverse movement is moved somewhat away from and, reversely, toward the gear 236.

In Fig. 7 in which the slide 245 is shown at the extreme right of its movement the rack 243 is shown displaced toward the left with respect to the right hand end wall of the recess 291. As the slide 245 is moved from left to right in Fig. 7 the left end wall of the recess 291 will bear against the adjacent end wall of the rack 243, leaving open the space at the right hand end, and this relation of parts is maintained as the rack 243 comes into engagement with the teeth of the gear 236 and rotates this gear clockwise in Fig. 10 during the continued movement of the slide toward the right until screw 281 abuts the wall 283. Upon reverse movement of the slide the right hand end wall of the slot 291 comes into engagement with the right hand end of the rack 243 and the rack is then moved toward the left to rotate the gear 236 in the counterclockwise direction. During this slight initial movement of the slide and its arm 251 to bring the right hand end wall of the recess 291 into engagement with the rack 243, the rack will be moved inwardly along the slot 295 into closer meshing engagement with the teeth of the gear 236. Such closer meshing engagement tends to produce somewhat greater angular rotation of the gear 236 in the counterclockwise direction on the axis of the stem 15 as this initial movement of the slide 245 towards the left takes place than would be the case if the rack 243 were rigidly attached to the arm 251 of the slide.

When the trailing tooth of the rack 243 moving toward the left passes out of driving engagement with the teeth of the gear 236, substantially in the position shown in Fig. 10 as to the relation of the teeth of the rack and of the gear, the leading or left hand tooth in Fig. 10 of the rack 242 is about to enter engagement with the teeth of the gear 236. The slight initial counterclockwise rotation of the gear 236 which has been effected by virtue of the inwardly disposed position of the rack 243, as mentioned above, has effected slight movement of the tooth 244 of the gear 236 which otherwise might interfere with and prevent the leading tooth of the rack 242 from moving into the space between the teeth 244 and 246 of the gear, so that such interference does not occur. In Fig. 10 as the slide continues to move toward the left the teeth of the rack 242 engage the teeth of the gear 236 to effect rotation of this gear in the clockwise direction. In the movement of the leading tooth of the rack 242 from the position shown in Fig. 10 to the position where it engages the tooth 246 of the gear 236, the trailing tooth of the rack 243 will have passed further to the left, so that the tooth 248 of the gear 236 which the rack 243 has last engaged will be able to pass by the trailing tooth of the rack 243. Thus locking of the gear 236 by the racks is prevented.

The leftward movement of the slide 245 may continue until the left hand screw 281 abuts the wall 284 of the casing and the hub 253 is in the dotted line position and the trailing tooth of the rack 242 shall have moved the tooth 244 of the gear 236 to a position in which the requisite rotation of the sleeve 38 will have been produced to secure seating movement of the plug as the slide 245 reaches the left hand end of its movement.

It will be understood in such leftward movement of the slide 245 that the counterclockwise rotation of the gear 236 effected by the rack 243 produces unseating rotation of the sleeve 38, the threads 229 being cut on the sleeve and in the member 223 in the proper direction to secure such unseating. Correspondingly, when the gear 236 subsequently is engaged by the rack 242 in the leftward movement of the slide 245, clockwise rotation of the gear 236 and of the sleeve 38 will produce seating movement of the plug. The actuating means which comprises the racks 242, 243, therefore, is moved in the rectilinear path of movement of the slide 245 successively into engagement with the gear 236 and in two zones of action spaced along the path of movement of the slide. By virtue of the disposition of the racks at the opposite sides of the gear 236 the required forward and reverse rotations of the gear and of the sleeve 38 both in the forward movement of the slide 245, for example toward the left as described in the previous paragraph, as well as in the reverse movement toward the right are secured.

In this reverse movement toward the right the segment 242 first rotates the gear 236 counterclockwise and then, as the trailing tooth of this segment is about to pass out of engagement with the tooth 244 of the gear 236, the leading tooth of the segment 243 is about to engage the tooth 250 of the gear 236. If the segment 243 happens to be disposed toward the right of its recess 291, Fig. 10, and the leading tooth of the segment 243, therefore, may come into engagement with the tooth 248 of the gear 239 without being able to enter the space between the teeth 248 and 250, then sliding movement of the segment 243 along the slot 295 will take place so that the outward movement of the segment 243 is effected to clear the leading tooth of the segment from the engaged tooth of the gear 236. Continued movement of the slide toward the right, therefore, will enable this leading tooth of the segment to pass into the space between the two teeth 248 and 250 of the gear 236 and into engagement with the tooth 250 to begin the clockwise rotation of the gear 236 and seating movement of the plug.

It will be understood from a consideration of the drawings and the description above given and having regard to the angularly displaced extreme positions of the forked arm 233 as above described that unseating movement may be started, for example in the leftward movement of the slide 245 effecting counterclockwise rotation of the gear 236 or sleeve 38 by the rack 243, as the pin 260 moves along the face 277 of the arm 271 of the forked member 233 until the pin 260 engages the side of the slot 273 and starts clockwise rotation of the arm 233 and, therefore, of the plug 3. Such rotation of the forked arm 233 is continued through the median position of Fig. 10 to the position shown in dotted lines in Fig. 10 as the rack 242 comes into engagement with the gear 236 and starts the clockwise rotation of the gear 236 and of the sleeve 38 to effect seating of the plug. Such seating movement is continued as the pin 260 passes out of the slot 273 and along the surface 275 of the arm 272 of the forked arm until reseating is completed.

In Fig. 8 is a diagrammatic representation of the actuating member 300 of an indicating device, this member having arms 301 approximately at 90° with respect to each other about the axis of a stud 302 on which this member is pivotally supported in a boss 304 formed on the cover 305 of the casing provided by the base 215 and the walls 283, 284 and the side walls 307. This cover is fastened to the casing by through bolts and tap bolts 309 cooperating with flanges 311, 313 respectively on the cover and on the casing and with end wall 284 of this casing. The cover may carry indices over which an indicator finger 315 fastened to the stud 302 by a nut 316 threaded on the stud moves to indicate the positions of the plug. These indices may correspond to the positions of the arms 301 as shown by the legends in Fig. 8. Thus, movement of the left hand arm 301 to the position identified as "open unseated" may correspond to the dotted line position of the forked member 233, Fig. 10. The full line position of the member 300 in Fig. 8 corresponds to the full line position of the forked arm 233 shown in Fig. 10. Continued movement of the slide toward the left in Fig. 10, the pin 260 moving along the surface 275 concomitantly with seating movement of the plug effected by the rack 242 moves the indicator member 300 to the dotted position identified by the legend "open and seated." Similarly, in the positions of the pin 260 at the right of the median position shown in Fig. 10 the member 300 will take the dotted positions of Fig. 8 respectively identified as "closed unseated" and "closed seated." The angular movement of the arms 301 from the full line position respectively to the dotted line positions identified as "open unseated" and "closed unseated" is approximately 45° corresponding to the 45° rotation of the forked arm 233 from the median position of Fig. 10. Further movement of the respective arms 301 to the "open and seated" and "closed and seated" positions of Fig. 8 is effected through an angle of about 30°, the total rotation of the member 300 and of the indicator finger 315 at either side of the median position being about 75°.

The arms 301 each are formed with slots 317 at the outer ends thereof open downwardly in Fig. 9 to receive pins 319 which are carried upon the bridge member 265 for movement therewith and with the slide 245. It will be understood that one of the pins 319 is effective to engage the adjacent arm, Fig. 8, to move this arm in the direction toward the median center line through the stud 302 and the other pin is effective to move its arm in the opposite direction toward this median center line. Each of the pins 319 passes out of engagement with the corresponding slot 317 as such slot moves from the median position of Fig. 10. The other pin, however, entering the slot of its arm effects the requisite angular movement of the member 300 to the positions of the other arm 301 identified by the legends at the respective opposite sides of the median line, Fig. 8. The provision of these two pins and corresponding arms 301 on the member 300 obviates the need of a connection directly to the stem 15 and the construction makes possible the removal of the cover 305 together with the indicating device without displacing the active parts of the actuating mechanism of the invention.

The slide member 245 of Figs. 7, 9, 10 and 11 is provided with a recess in the hub 253 carried by the slide member into which recess from below the cylindrical head 321 of an operating rod 323 is inserted. Rectilinear axial movement of the rod 323 toward the right and left in Figs. 7 and 10 effects the requisite movement of the slide member to produce actuation of the mechanism of the invention as above described. The rod 323 passes through a stuffing box 325 having a gland 327 confining the packing in the box by means of studs 329 and nuts 330 for confining the lubricant in the casing. The rod 323 extends outwardly of the casing through this stuffing box and is integral with the piston rod of a conventional fluid pressure valve operator 333 to which through the pipe connections 334 the operating fluid may be admitted to produce reciprocating movement of the piston of the operator and reciprocating movement of the rod 323. The cylinder 333 is connected by rigid mounting bracket 331 to the casing or base 215, the rod 323 passing freely through an opening in this bracket.

Other types of conventional valve operators may be used to produce the rectilinear movement of the slide 245 as above described. In Fig. 12 a rotatable shaft 335 passes through a stuffing box 336 and packing confining gland 337. The shaft 335 is provided with a collar 339 formed thereon disposed in a recess 340 in and in bearing relation to the end wall 284 of the casing, the wall of the stuffing box being secured to this end wall by means of the studs 341 and providing an opposed wall of the recess. The shaft 335 is provided with a thread 343 extending over a substantial length thereof, this threaded portion engaging a nut 345 fastened by screws 346 in a hub 347 corresponding to the hub 253 of Fig. 7 and carried by the slide 245. It will be understood that upon rotation of the shaft 335 which is held by collar 339 against endwise movement the nut 345 is moved along the threaded portion of the shaft and the slide 245 thereby also is moved in rectilinear movement to actuate the mechanism of the invention in the manner which has been described in connection with Figs. 7, 9, 10 and 11. In the modification of Fig. 12 only the upper bearing 237 for the stem 15, the forked arm 233 and its hub 231 and the upper part of the sleeve 38 and its gear 236 are shown of the actuating mechanism of the invention.

Rotation of the shaft 335 may be effected by any conventional valve operator 349 capable of producing forward and reverse rotational movement in order to effect forward and reverse rotation of the shaft 337 and corresponding movement of the slide toward the left and toward the right in Fig. 12.

In Fig. 13 is shown diagrammatically another modification of the means for effecting movement of the slide. In this figure a rod 351 is provided at its right hand end with a square head 353 insertable in a correspondingly shaped socket in the hub 355 of the slide member 245 corresponding to the slide member 245 of Figs. 7, 9, 10 and 11. The rod 351, therefore, is held against rotation with respect to the hub 355 and the slide member. This rod, however, is provided at its left hand portion with a thread extending over a substantial length thereof upon which is threadingly engaged a member 357 held against movement thereof in the direction parallel to the axis of the rod 351 by abutments 359 but capable of rotational movement between these abutments. Upon rotation of the member 357 it will be apparent that movement of the rod 351 is effected parallel to the axis thereof and correspondingly rectilinear movement of the hub 355 and of the slide member 245 will be effected to secure the actuation of the mechanism of the invention, which has been described in connection with Figs. 7, 9, 10 and 11.

Any conventional valve operator or other suitable means for effecting rotation of the rotatable member 357 may be utilized which is capable of rotating the member 357 forwardly and reversely and correspondingly movement of the rod 351 toward the left and toward the right to actuate the mechanism of the invention within the casing 361.

In Fig. 14 is shown a longitudinal section of a valve having a body 365 and flanges 367 provided with bolt holes therein for coupling the flanges 367 to companion flanges on the adjacent pipe sections in the pipe line. In this embodiment the cone of the seat 369 and of the plug 370 is inverted from the positions which are shown for the valves of Figs. 1, 3 and 7. The valve of Fig. 14 is provided with a bonnet 371 secured by studs 372 and nuts 373 to the companion portion of the body 365, a suitable packing ring 375 being set in a groove in the bonnet to secure fluid tightness. This bonnet also provides a groove in which a packing ring 376 is disposed engaging the turned stub end 377 of the plug 370 in fluid tight relation.

In the embodiment of Fig. 14 the plug also is provided at its upper end with a stub shaft 379 with which a packing ring 380 and a gland 381 cooperate to secure pressure tightness, the gland 381 fitting in a bore in the corresponding portion of the body 365 and being secured by tap bolts 382. Rotation of the plug is effected by means of a T slot connection, as shown in Fig. 14, the T slot 383 being formed in the upper end of the stub shaft 379. In this slot a T head 385 formed on the lower end of a rotatable spindle 387 is inserted, this spindle also having formed thereon screw threads 389 engaging corresponding internal threads of a sleeve 38 carrying gear 50 meshing with gear 51 similarly to the device of Fig. 1.

In the device of Fig. 14 a supporting member 391 is formed at its lower end with a turned portion fitting in the shoulder 393 machined in the upper end of the body 365, the member 391 also being provided with a flange 395 engaged by clamps 396 secured to the valve body 365 by tap bolts 397 to secure the supporting member 391 in position on the valve body. The supporting member 391 at its upper portion carries a hub 399 bushed to receive the sleeve 38 for rotational movement of the sleeve upon rotational movement of the gear 50. The sleeve 38 is formed with a shoulder 401 cooperating with washer 402 bearing against an upper surface 403 of the supporting member 391 to prevent downward movement of the sleeve upon rotation thereof in engagement with the threads on the spindle 387. Upward movement of the sleeve is prevented by the spanner nut 405 threaded on the threaded lower end 407 of the sleeve 38 and bearing upon washer 409. The bearing of the washers 402 and 409 respectively on the surfaces 403 and the end of the hub 399 is such that the rotational movement of the sleeve may take place without binding while preventing axial movement of this sleeve, thereby to produce axial movement of the spindle 387 by virtue of the engagement of the threads 389 in the threads of the sleeve 38. Such axial movement of the spindle 387 will effect axial movement of the plug 370, the T head 385 lifting the plug 370 and the flange 386 serving to move the plug downwardly by engagement with the end of the stub shaft 379, Upon rotation of the sleeve 38 clockwise about the axis of the spindle 387 and of the plug in Figs. 14 and 15 downward movement of the spindle 387 and of the plug 370 will be produced. As in the embodiment being described the plug is inverted, such downward movement will produce unseating movement of the plug. This is accomplished in the embodiment of Figs. 14 and 15 by sliding movement of the body of the plug with respect to the shoes 420 formed with dovetail grooves 421 receiving corresponding dovetails 423 provided on the plug 370. The dovetail grooves and dovetails extend parallel to the slope of the cone of the plug. Downward movement of the plug, therefore, will produce movement of the left hand shoe 420 toward the right, Fig. 14, and of the right hand shoe 420 in this figure toward the left. Thus, the shoes will be drawn away from the seats 369 formed in the body 365. In such movement the shoes 420 and the inserted segments 425 carried thereby for engagement with the seats are moved out of contact with these seats. Such unseating movement is effected by the actuation of the mechanism of the invention which produces rotation of the sleeve 38 prior to starting rotational movement of the plug 370. Seating movement of the shoes is effected by reverse rotation of the sleeve 38.

In order to secure such rotation of the plug in the embodiment of Fig. 14 a member 427 is keyed on the spindle 387 for movement therewith both of rotation and parallel to the axis of the spindle. This member carries a follower vane 429 which is engaged by an actuating element (not shown in Fig. 14) carried on the portion 430 of a rotatable member 431 which is supported within a turned flange 433 on the supporting member 391. The rotatable member 431 is held in place for such rotation by a cap member 435 engaging the surface 436 of the portion 430 and secured in place by bolt 437 tapped at its lower end in the supporting member 391 and carrying a spacing bushing 439 shouldered adjacent its ends to abut the supporting member 391 and the cap member 435. Upon the central enlarged portion of this bushing the gear 51 is rotatably supported. The cap member 435 is secured by nuts 441 threaded on the upper ends of the bolts 437. This cap member also is provided with a hub 443 bored to receive the bearing of the upper end of the spindle 387.

Upon rotational movement of the rotatable member 431 by means of an integral hand wheel 445 the actuating element above mentioned of the portion 430 is brought into engagement with the follower vane 429 to effect rotation of the spindle 387 and of the plug 370 in a manner similar to that described in connection with Fig. 1. It will be understood in this embodiment of the invention that the disposition of the actuating element and of the vane 429 are such that, in the rotation of the member 431 in a given direction, rotation of the gears 50, 51 and of the sleeve 38 by a gear segment 80 in the manner described in connection with Fig. 1 is effected prior to rotation of the spindle 387 by engagement of the actuating element with the vane 429. Moreover, it will be understood, as the segment 80 continues its movement in the given direction in the manner described in connection with Fig. 1 so as to be disengaged from one gear and to engage the other, that reverse rotation of the sleeve 38 will be produced after the spindle 387 has been rotated to its new position in either the open or the closed position of the plug.

In the embodiment of Fig. 14 the plug 370 and its shoes 420 may be set in the seated position with respect to the seats 369 by operation of the set screw 450 into engagement with the lower stub end 377 of the plug 370. Such actuation of the screw 450 may be effected upon removal of the cap 451 threaded into a hub carried by the bonnet 371. The packing 380 thus may be renewed while the valve is under pressure.

Various modifications of the invention in its application to rotatable conical plug valves and similar closures will be apparent to those skilled in the art both with respect to the utilization of conventional valve elements and conventional valve operators. Modification also may be made in the essential mechanism of the invention which provides for intermittent operative connection or intermittent engagement of the actuating means, more especially gear segment means, with means effective to produce axial movement of the plug. Variations also may be made in the form and the arrangement of this actuating means, particularly the gear segment means to secure clearance and preventing locking of the parts of the actuating means as above disclosed. In the embodiment in which a gear segment of arcuate form is used any other means may be utilized than the support of this gear segment in a circular groove to secure the tilting action which effects the clearance of the teeth of the segment with respect to the two gears into mesh with which in succession it is movable. Such variations will be understood to come within the generic concept of the invention.

I claim:

1. An operating mechanism for a valve having a plug supported for movement thereof along the axis of the plug forwardly away from seating position and rotatable on said axis and movable reversely toward seating position both in the opening and in the closing movement of said plug, said valve having a stem connected to said plug and movable therewith forwardly and reversely along said axis and rotatable with said plug on said axis, said operating mechanism comprising a rotatable member operatively connected to said stem and capable of effecting axial movement of said stem forwardly upon rotation of said rotatable member in a given direction and axial movement of said stem reversely upon reverse rotation of said rotatable member, a gear supported for rotation on its axis and operatively connected to said rotatable member for effecting rotation of said rotatable member in said given and reverse directions respectively upon rotation of said gear forwardly and reversely, gear elements disposed in spaced relation along a predetermined path of movement of said elements and connected together for concomitant movement of said gear elements forwardly and reversely along said path, said gear elements being disposed in spaced relation transversely of said path for engagement with said gear respectively at opposite sides of the axis of rotation of said gear and in zones spaced along said path for effecting forward and reverse rotations of said gear both during said forward movement and during said reverse movement of said gear elements in said path.

2. An operating mechanism for a valve having a plug supported for movement thereof along the axis of the plug forwardly away from seating position and rotatable on said axis and movable reversely toward seating position both in the opening and in the closing movement of said plug, said valve having a stem connected to said plug and movable therewith forwardly and reversely along said axis and rotatable with said plug on said axis, said operating mechanism comprising a rotatable member operatively connected to said stem and capable of effecting axial movement of said stem forwardly upon rotation of said rotatable member in a given direction and axial movement of said stem reversely upon reverse rotation of said rotatable member, a gear supported for rotation on its axis and operatively connected to said rotatable member for effecting rotation of said rotatable member in said given and reverse directions respectively upon rotation of said gear forwardly and reversely, and a pair of racks supported for movement lengthwise of the respective racks in parallel paths at opposite sides of the axis of rotation of said gear and connected together in spaced relation in the direction along said paths for movement in meshing engagement with said gear in succession at said opposite sides of said axis to produce said forward and reverse rotations of said gear both during forward movement and during reverse movement of said racks in said paths.

3. An operating mechanism for a valve having a plug supported for movement thereof along the axis of the plug forwardly away from seating position and rotatable on said axis and movable reversely toward seating position both in the opening and in the closing movements of said plug, said valve having a stem connected to said plug and movable therewith forwardly and reversely along said axis and rotatable with said plug on said axis, said operating mechanism comprising rotatable means operatively connected to said stem for effecting axial movement of said stem forwardly upon rotation of said rotatable means in a given direction and axial movement of said stem reversely upon reverse rotation of said rotatable means, a gear supported for rotation on its axis, a second gear supported for rotation on its axis and meshing with said first gear, a gear segment supported for arcuate movement thereof about an axis and for movement of said gear segment in meshing engagement with said two gears in succession to effect rotation of said meshing gears forwardly and reversely in succession upon said arcuate movement of said segment gear in a selected direction, and mean operatively connecting said meshing gears to said rotatable means for effecting rotation of said rotatable means in said given and reverse directions to effect in succession both said axial movements of said stem concomitantly with said meshing engagement in succession of said gear segment with said meshing gears during arcuate movement of said gear segment in said selected direction.

4. An operating mechanism for a valve having a plug supported for movement thereof along the axis of the plug forwardly away from seating position and rotatable on said axis and movable reversely toward seating position both in the opening and in the closing movement of said plug, said valve having a stem connected to said plug and movable therewith forwardly and reversely along said axis and rotatable with said plug on said axis, said operating mechanism comprising a gear supported for rotation on its axis, a second gear supported for rotation on its axis parallel to and in offset relation to said axis and meshing with said first gear, a member supported for forward and reverse rotation thereof on an axis parallel to and offset relative to said axes of rotation of said gears, a gear segment supported by said member with the teeth thereof distributed peripherally about the axis of rotation of said member and disposed for movement of said segment in meshing engagement with said gears in succession in both said forward and said reverse rotations of said member, the number of teeth on said segment being such that said segment moves into meshing engagement with one of said two gears concomitantly with moving out of meshing engagement with the other gear to effect rotation of said gears forwardly and then reversely upon rotation of said member on its axis in a selected direction, means operatively connected to said first gear and connected to said stem for effecting during rotation of said member in said selected direction with said gear segment in mesh with said first gear axial movement of said stem forwardly and thereafter axial movement of said stem reversely with said gear segment in mesh with said second gear, and means operatively connected to said member and to said stem to effect rotation of said stem on its axis concomitantly with disengagement of said gear segment from said first gear and engagement of said gear segment with said second gear in said rotation of said member in said selected direction.

5. An operating mechanism for a valve having a rotatable plug as defined in claim 4, said gear segment being supported by said member for movement of said segment relative to said member along an arc of less radius than the pitch circle of said segment to facilitate disengagement of said segment from one gear upon engagement thereof with the other gear.

6. An operating mechanism for a valve having a plug supported for movement thereof along the axis of the plug forwardly away from seating position and rotatable on said axis and movable reversely toward seating position both in the opening and in the closing movement of said plug, said valve having a stem connected to said plug and movable therewith forwardly and reversely along said axis and rotatable with said plug on said axis, which comprises a member rotatable forwardly and reversely on an axis parallel to and offset with respect to said stem axis, said member providing cam surfaces spaced circumferentially about said axis of said member and movable therewith in an arcuate zone disposed beyond said stem axis in a direction from the axis of said member toward said stem axis, and a cam follower carried by said stem for angular movement therewith upon the axis of said stem, said cam follower having arms disposed in angularly spaced relation to each other about the axis of said cam and so as to be engaged respectively by the respective cam surfaces of said member in the forward rotation and in the reverse rotation of said member on its axis to effect rotation of said stem between open and closed positions of said plug.

7. An operating mechanism for a rotatable plug valve as defined in claim 6 which comprises stop means disposed so as to engage said arms in the respective positions thereof to which they are moved by the respective cam surfaces in said forward and reverse rotations of said member and cooperating with said cam surfaces to hold said stem respectively in the positions of said stem corresponding to open and closed positions of said plug.

8. An operating mechanism for a rotatable plug valve as defined in claim 1 which comprises a member supporting said gear elements in said spaced relation for said concomitant movement thereof along said path, at least a selected one of said gear elements being supported by said member for movement thereof transversely of said path to facilitate disengagement of said gear from one of said elements concomitantly with engagement of said gear with the other of said elements.

9. An operating mechanism for a rotatable plug valve as defined in claim 8 in which said selected gear element is supported by said member for said transverse movement thereof diagonally with respect to said path of movement of said member and said elements supported thereby.

10. An operating mechanism for a valve having a plug supported for movement thereof along the axis of the plug forwardly away from seating position and rotatable on said axis and movable reversely toward seating position both in the opening and in the closing movement of said plug, said valve having a stem connected to said plug and movable therewith forwardly and reversely along said axis and rotatable with said plug on said axis, said operating mechanism comprising kinematic means supported for movement thereof forwardly and reversely and operatively connected to said stem for effecting axial movement of said stem forwardly upon movement of said kinematic means forwardly and axial movement of said stem reversely upon movement of said kinematic means reversely, and actuating means supported for movement thereof in a predetermined path forwardly successively through two zones of such movement spaced along said path and reversely successively through said zones, said actuating means being operatively connected to said kinematic means in a given zone concomitantly with being disconnected from said kinematic means in said other zone and being operatively connected to said kinematic means in said other zone concomitantly with being disconnected from said kinematic means in said given zone so as to produce in succession said forward and reverse movements of said kinematic means both during said forward movement and during said reverse movement of said actuating means in said path.

11. An operating mechanism for a valve having a plug supported for movement thereof along the axis of the plug forwardly away from seating position and rotatable on said axis and movable reversely toward seating position both in the opening and in the closing movement of said plug, said valve having a stem connected to said plug and movable therewith forwardly and reversely along said axis and rotatable with said plug on said axis, said operating mechanism comprising rotatable means operatively connected to said stem for effecting axial movement of said stem forwardly upon rotation of said rotatable means in a given direction and axial movement of said stem reversely upon reverse rotation of said rotatable means, and actuating means supported for movement thereof in a predetermined path forwardly successively through two zones of such movement spaced along said path and reversely successively through said zones, said actuating means being operatively connected to said rotatable means in a given zone concomitantly with being disconnected from said rotatable means in said other zone and being operatively connected to said rotatable means in said other zone concomitantly with being disconnected from said rotatable means in said given zone so as to produce in succession said forward and reverse movement of said rotatable means both during said forward movement and during said reverse movement of said actuating means in said path.

12. An operating mechanism for a valve having a plug supported for movement thereof along the axis of the plug forwardly away from seating position and rotatable on said axis and movable reversely toward seating position both in the opening and in the closing movement of said plug, said valve having a stem connected to said plug and movable therewith forwardly and reversely along said axis and rotatable with said plug on said axis, said operating mechanism comprising rotatable means operatively connected to said stem for effecting axial movement of said stem forwardly upon rotation of said rotatable means in a given direction and axial movement of said stem reversely upon reverse rotation of said rotatable means, gear means supported for rotation thereof forwardly and reversely and operatively connected to said rotatable means for effecting rotation of said rotatable means in said given and reverse directions respectively upon rotation of said gear means forwardly and reversely, and gear segment means supported for movement thereof in a predetermined path forwardly successively through two zones of such movement spaced along said path and reversely successively through said zones, said gear segment means in its forward movement in said path having an advance portion brought into driving meshing relation with said gear means in a given one of said two zones concomitantly with release of a trailing portion of said gear segment means moving out of meshing relation with said gear means in said other zone, said gear segment means in its reverse movement in said path having said trailing portion brought into driving meshing relation with said gear means in said other zone concomitantly with release of said advance portion of said gear segment means moving out of meshing relation with said gear means in said given zone to produce said forward and reverse rotations of said gear means both during said forward movement and during said reverse movement of said gear segment means.

13. An operating mechanism as defined in claim 10 which comprises means operatively connected to said actuating means and to said stem and operable to effect rotation of said stem on its axis concomitantly with said connections and disconnections of said actuating means to and from said kinematic means in the respective zones.

14. An operating mechanism for a valve having a plug supported for movement thereof along the axis of the plug forwardly away from seating position and rotatable on said axis and movable reversely toward seating position both in the opening and in the closing movement of said plug, said valve having a stem connected to said plug and movable therewith forwardly and reversely along said axis and rotatable with said plug on said axis as defined in claim 1 which comprises means operatively connected to said stem for rotating said stem on its axis forwardly from a first position corresponding to the closed position of said plug to a second position corresponding to the open position of said plug and reversely to said first position, said means being operatively connected to said gear elements for effecting said forward and reverse movements of said elements to produce in each of said movements said forward and reverse rotations of said gear and concomitantly forward axial movement of said stem before rotation of said stem from either of said two positions and reverse axial movement of said stem after rotation thereof to either of said positions.

15. An operating mechanism for a valve having a plug supported for movement thereof along the axis of the plug forwardly away from seating position and rotatable on said axis and movable reversely toward seating position both in the opening and in the closing movement of said plug, said valve having a stem connected to said plug and movable therewith forwardly and reversely along said axis and rotatable with said plug on said axis as defined in claim 3 which comprises means operatively connected to said gear segment and to said stem for rotating said stem on its axis concomitantly with disengagement of said gear segment from said first gear and engagement of said gear segment with said second gear in said movement of said gear segment in the selected direction.

16. An operating mechanism for a valve having a plug rotatable and movable along its axis as defined in claim 4 which comprises a sleeve having an external thread formed about the axis of said sleeve coaxially with said axis of said stem, said sleeve being rotatable relative to said stem in given and reverse directions, means operatively connecting said sleeve to said stem for axial movement therewith, a nut engaging said thread for effecting axial movement of said sleeve upon rotation of said sleeve relative to said nut, a gear carried by said sleeve for rotation therewith on the axis of said sleeve, a second gear supported for rotation thereof on an axis parallel to and offset from said axis of said sleeve and meshing with said first gear, a member supported for rotation thereof on an axis parallel to and offset relative to said axes of said gears, a gear segment supported by said member with the teeth thereof distributed peripherally about the axis of rotation of said member and disposed for movement into and out of meshing engagement with said first and second gears in succession upon rotation of said member on its axis, the number of teeth of said segment being such that said segment moves into meshing engagement with one of said two gears concomitantly with moving out of meshing engagement with the other gear to effect rotation of said gears forwardly and reversely upon rotation of said member on its axis in a selected direction to effect rotation of said sleeve in said given and reverse directions and axial movement of said stem forwardly and reversely, and means providing an intermittent driving connection between said member and said stem to effect forward and reverse rotational movements of said stem concomitantly with engagement and disengagement of said gear segment with said two gears in succession upon rotation of said member in said selected and in the reverse directions.

17. An operating mechanism for a valve as defined in claim 3 in which said gear segment is supported for movement thereof transversely of said arcuate movement thereof to facilitate disengagement of said segment from one gear upon engagement thereof with the other gear.

18. An operating mechanism for effecting movement of a member supported for movement forwardly along an axis of rotation, rotation of said member on said axis and movement of said member reversely along said axis, said mechanism comprising kinematic means supported for movement thereof forwardly and reversely and operatively connected to said member for effecting axial movement of said member forwardly upon movement of said kinematic means forwardly and axial movement of said member reversely upon movement of said kinematic means reversely, and actuating means supported for movement thereof in a predetermined path forwardly successively through two zones of such movement spaced along said path and reversely successively through said zones, said actuating means being operatively connected to said kinematic means in a given zone concomitantly with being disconnected from said kinematic means in said other zone and being operatively connected to said kinematic means in said other zone concomitantly with being disconnected from said kinematic means in said given zone so as to produce in succession said forward and reverse movements of said kinematic means both during said forward movement and during said reverse movement of said actuating means in said path.

19. An operating mechanism for a valve having a rotatable plug movable along its axis as defined in claim 12 in which said gear segment means is supported for movement thereof transversely of said predetermined path thereof to a position of less engagement of said segment means with said gear means to facilitate engagement with and disengagement from said gear means in said two zones.

20. An operating mechanism as defined in claim 16, said means providing an intermittent driving connection between said member and said stem comprising a quadrant gear coaxial with and secured to said stem for rotation therewith, means providing a transfer gear supported for rotation thereof on an axis offset from said quadrant gear axis and meshing with said quadrant gear, and means carried by said member and engaging said means providing said transfer gear intermittently in the rotation of said member for effecting rotation of said transfer gear and of said quadrant gear meshing therewith to rotate said stem forwardly and reversely concomitantly with rotation of said member in said selected direction and in the reverse direction.

21. An operating mechanism as defined in claim 20, said means providing an intermittent driving connection between said member and said stem comprising an element carried by said member and rotatable therewith, said transfer gear carrying projections therefrom engageable by said element in the respective directions of movement of said element corresponding to rotation of said member in said selected direction and in the reverse direction for effecting limited rotation of said transfer gear to two positions determining positions of said stem corresponding to said open and closed positions of said plug.

22. An operating mechanism as defined in claim 20 which comprises stop means engaging said transfer gear in positions thereof to which it is rotated for limiting the rotation thereof and of said quadrant gear and stem to determine positions of said stem corresponding to the closed and open positions of said plug.

References Cited in the file of this patent

UNITED STATES PATENTS

| Re. 22,455 | Wilson | Mar. 13, 1944 |
| 2,034,291 | Gannestad | Mar. 17, 1936 |
| 2,064,765 | Powell | Dec. 15, 1936 |
| 2,104,151 | Brisbane | Jan. 4, 1938 |
| 2,114,673 | Brisbane | Apr. 19, 1938 |
| 2,128,071 | Bischoff | Aug. 23, 1938 |
| 2,144,305 | Brisbane | Jan. 17, 1939 |
| 2,152,810 | McFarlane | Apr. 4, 1939 |
| 2,327,425 | Hilker | Aug. 24, 1943 |
| 2,329,788 | Rutledge | Sept. 21, 1943 |
| 2,383,549 | Hilker | Aug. 28, 1945 |
| 2,705,609 | Prescott | Apr. 5, 1955 |
| 2,748,605 | Allen | June 5, 1956 |
| 2,749,082 | Allen | June 5, 1956 |